United States Patent
Causemann et al.

(10) Patent No.: US 10,703,182 B2
(45) Date of Patent: Jul. 7, 2020

(54) LOADING SPACE COVER AND MOTOR VEHICLE

(71) Applicant: FORD GLOBAL TECHNOLOGIES, LLC, Dearborn, MI (US)

(72) Inventors: Christian Causemann, Cologne (DE); Emil Jarmonik, Leverkusen (DE); Claas Schaefer, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 16/008,669

(22) Filed: Jun. 14, 2018

(65) Prior Publication Data

US 2018/0361840 A1    Dec. 20, 2018

(30) Foreign Application Priority Data

Jun. 16, 2017  (DE) .......................... 10 2017 210 120

(51) Int. Cl.
*B60J 7/16* (2006.01)
*B60R 5/04* (2006.01)

(52) U.S. Cl.
CPC ............. *B60J 7/1607* (2013.01); *B60R 5/044* (2013.01)

(58) Field of Classification Search
CPC .......... E05D 7/1077; E05D 3/02; B60R 7/06; B60R 7/04; B60R 5/044; E05Y 2900/538
USPC .......................................... 296/37.16, 100.01
See application file for complete search history.

(56) References Cited

U.S. PATENT DOCUMENTS

| | | | |
|---|---|---|---|
| 6,752,304 B1* | 6/2004 | Hotary | B60K 37/00 224/544 |
| 7,695,042 B2* | 4/2010 | Leroy | B60R 5/045 296/37.16 |
| 8,833,988 B2 | 9/2014 | Larsson | |
| 9,783,117 B2* | 10/2017 | Nieto | B60R 11/00 |
| 10,081,305 B2* | 9/2018 | Brown | B60R 7/08 |
| 2017/0088058 A1* | 3/2017 | Krishnan | B60R 5/045 |

FOREIGN PATENT DOCUMENTS

| | | |
|---|---|---|
| DE | 19714497 A1 | 10/1998 |
| DE | 19858429 A1 | 6/2000 |
| DE | 202015001437 U1 | 5/2016 |
| EP | 0761503 A1 | 3/1997 |

(Continued)

OTHER PUBLICATIONS

English Machine Translation of DE19714497A1.

(Continued)

*Primary Examiner* — Pinel E Romain
(74) *Attorney, Agent, or Firm* — David Coppiellie; King & Schickli, PLLC

(57) ABSTRACT

A loading space cover for a rear loading space in a motor vehicle, includes at least one cover element for the at least partial covering of an upper side of the rear loading space. The cover element defines an upper limit of the loading space. To enable a hazard warning triangle to be carried in the motor vehicle with the least possible modification of components of the motor vehicle, the motor vehicle includes at least one fastening unit arranged on an underside of the cover element facing the loading space for the direct or indirect fastening of an accessory, preferably a hazard warning triangle, to the cover element.

14 Claims, 5 Drawing Sheets

(56) References Cited

FOREIGN PATENT DOCUMENTS

| EP | 1012002 B1 | 3/2003 |
|---|---|---|
| FR | 2307678 A1 | 11/1976 |

OTHER PUBLICATIONS

English Machine Translation of DE19858429A1.
English Machine Translation of DE202015001437U1.
English Machine Translation of EP0761503A1.
English Machine Translation of EP1012002B1.
English Machine Translation of FR2307678A1.
"Golf Storage Tray"; VW Golf Forum; http://www.golfmkv.com/forums/showthread.php?T=117127; Sep. 29, 2016; pp. 1-11.

* cited by examiner

LOADING SPACE COVER AND MOTOR VEHICLE

TECHNICAL FIELD

This document relates to a loading space cover for a rear loading space in a motor vehicle, exhibiting at least one cover element for the at least partial covering of an upper side of the rear loading space, wherein the cover element defines an upper limit of the loading space.

Furthermore, this document relates to a motor vehicle having at least one loading space cover for a rear loading space in the motor vehicle and at least one hazard warning triangle, wherein the loading space cover has at least one cover element for the at least partial covering of an upper side of the rear loading space and the cover element defines an upper limit of the loading space.

BACKGROUND

Motor vehicles usually have a rear loading space which is customarily separated from a passenger interior by a rear shelf element which is sometimes referred to as a parcel shelf. The rear shelf element usually extends horizontally between a rear window and a rear headrest of a motor vehicle. The rear shelf element covers an upper side of the rear loading space and, in so doing, defines an upper limit of the loading space.

Moreover, in many countries it is a compulsory requirement for a hazard warning triangle to be carried in a motor vehicle. The hazard warning triangle can, for example, be converted from a state of use in which the hazard warning triangle can be stood on the ground into a transport state in which the hazard warning triangle is configured in a space-saving manner, and vice versa, wherein the hazard warning triangle can be packed in its transport state into a casing. In order to be able to carry the hazard warning triangle in its transport state, motor vehicles are provided with differently designed stowage spaces to accommodate the hazard warning triangle with or without a casing at different positions. A vehicle manufacturer therefore usually has to develop and implement a stowage space concept for each individual vehicle model, which increases manufacturing costs.

EP 0 761 503 A1 relates to a storage compartment made of a cup-shaped container for passenger vehicles having a trunk that can be closed by means of a tailgate and a parcel shelf that can preferably be pivoted with the tailgate which rests on lateral horizontal bearing surfaces of the trunk when the tailgate is in the closed position. Thin, substantially horizontal flanges project laterally from the container on the lateral upper edges of the container. The lateral flanges are adapted to the contour of the bearing surface for the parcel shelf. The container can be inserted between the parcel shelf and the bearing surface for the parcel shelf.

EP 1 012 002 B1 relates to a cover designed as a case-like hollow body for a vehicle loading space having at least one transport container which is an integral component of the hollow body and is set up to accommodate load items between at least one trunk lid and a trunk floor. At least one positionally variable transport grip is provided on the at least one trunk lid and/or on the trunk floor. The grip is designed in such a manner that by moving said transport grip the trunk lid can be locked in respect of the trunk floor.

FR 2 307 678 A1 discloses a pivotably mounted rear storage element on the lower side whereof at least one receiving means is formed, for example for the form-fitting receiving of first-aid material or a hazard warning sign which indicates a vehicle breakdown.

The publication that can be downloaded at http://www.golfmkv.com/forums/showthread.php?t=117127 discloses a compartment for receiving different items such as a hazard warning triangle and first-aid supplies, for example, that can be arranged beneath the rear shelf element.

U.S. Pat. No. 8,833,988 B2 discloses a motor vehicle with a tailgate at which stowage space for a hazard warning triangle in the transport position is arranged.

DE 197 14 497 A1 relates to a pivotably mounted body part of a motor vehicle, in particular a luggage space cover, on the inside whereof at least one device can be inserted and removed and can thereby be clamped in the inserted state via at least one fastening means. The device comprises at least one stowage space, which is for its part coverable, for the storage of loose objects.

DE 20 2015 001 437 U1 relates to a tailgate cover panel for a pivotable tailgate of a motor vehicle, having a hazard warning triangle recess with an insertion opening in a wall of the tailgate cover panel for stowing a hazard warning triangle, wherein in a base of the hazard warning triangle recess, a wall-side engagement for the manual pivoting of the tailgate is integrated.

The problem addressed by the new and improved loading space cover disclosed herein is that of enabling a hazard warning triangle to be carried in a motor vehicle with the least possible modification of components in the motor vehicle for this purpose.

The problem is solved by a loading space cover having at least one fastening unit for the direct or indirect fastening of an accessory, preferably a hazard warning triangle, to the cover element arranged on an underside of the cover element facing the loading space.

It should be pointed out that the features and measures listed individually in the following description can be combined with one another in any technically feasible manner and disclose further embodiments of the loading space cover. The description characterizes and specifies the loading space cover, particularly also in the context of the drawings.

SUMMARY

According to the new and improved loading space cover, the cover element, which can also be referred to as the rear shelf element, is preferably used to carry the hazard warning triangle, so that no additional stowage space has to be created by modifying another component of the motor vehicle. This means that freedom when it comes to designing the other components of the motor vehicle is not constrained by the provision of stowage space for the hazard warning triangle. In addition, a concept for carrying the hazard warning triangle is proposed that is uniformly applicable to different vehicle models, as a result of which production costs are lowered. The loading space cover should not of course be limited to receiving and carrying a hazard warning triangle. Instead, other objects such as a first-aid kit, an umbrella or another accessory, for example, can also be secured. If, for the sake of simplicity, reference is made below to a hazard warning triangle, this should be understood to mean any accessory such as those just mentioned.

Furthermore, the hazard warning triangle, the first-aid box or kit, and the like, can also be quickly removed when the trunk is loaded, without having to empty the trunk. This is mainly necessary when it is stowed in side pockets of the trunk or beneath the floor of the loading area.

Since the fastening unit is arranged on the underside of the cover element facing the rear loading space, the hazard warning triangle arranged on the fastening unit is arranged within the rear loading space. The fastening unit may be configured in such a manner that the hazard warning triangle can be fastened via the fastening unit directly to the cover element. In this case, the hazard warning triangle is arranged on the fastening unit in its compact transport state, for example, without a casing enclosing the hazard warning triangle partially or completely. Alternatively, the fastening unit may be configured in such a manner that the hazard warning triangle can be indirectly fastened via the fastening unit to the cover element. In this case, before it is arranged on the fastening unit the hazard warning triangle is arranged partially or completely in a casing and then arranged on the fastening unit. The casing may be formed from a dimensionally stable plastic or a flexible material, for example.

The cover element may cover the upper side of the rear loading space partially or completely and thereby define an upper limit of the loading space. The cover element may be produced from a plastic or a composite material. The cover element may be pivotably mounted on the front side and connected to a tailgate of the motor vehicle in such a manner that the cover element is co-pivoted when the tailgate pivots.

The fastening unit may be arranged with respect to a longitudinal center axis of the vehicle approximately centrally on the underside of the cover element. In the case of a pivotably mounted cover element, the fastening unit may be arranged on a portion on the front side, in particular in the region of the pivot axis, of the covering unit, so that the amount of force required to pivot the cover element is increased only negligibly or not at all by the fastening unit and a hazard warning triangle arranged directly or indirectly thereon.

The motor vehicle may, for example, be a passenger vehicle with a fastback or a hatchback. It is possible for existing motor vehicles to be retrofitted with a loading space cover, either by installing a completely new loading space cover or providing an existing cover element with a fastening unit as described herein.

According to an advantageous embodiment, the fastening unit is connected in a substance-bonded manner to the cover element. In this way, the fastening unit can easily be connected to the cover element, namely without additional mechanical connection means, so that the vehicle weight is only increased by the weight of the fastening unit itself. The fastening unit may, for example, be connected to the cover element by a welding process or adhered thereto. Alternatively or in addition, the fastening unit may be connected to the cover element by means of least one mechanical connection means, for example via at least one screw connection, rivet connection, or the like.

A further advantageous embodiment envisages that the fastening unit has at least one clamping element which is arranged and configured in such a manner that the clamping element is elastically deformed by direct or indirect contact with the hazard warning triangle, at least during an attachment of the hazard warning triangle to the fastening unit and removal of the hazard warning triangle from the fastening unit. Following its elastic deformation, the clamping element can automatically be moved back again partially or completely into its non-deformed state by direct contact with the hazard warning triangle or indirect contact with the hazard warning triangle via a casing enclosing the hazard warning triangle either partially or completely. In this way, the proper transport position of the hazard warning triangle or of the casing enclosing the hazard warning triangle can be secured at the fastening unit or the cover element. If the clamping element in this case is only moved partly back into its non-deformed state, the clamping element may furthermore exert a clamping force on the hazard warning triangle or else the casing partially or completely enclosing the hazard warning triangle, as a result of which the position of the hazard warning triangle or the casing on the fastening unit is additionally secured and at the same time the hazard warning triangle or the casing is fixedly arranged on the fastening unit in such a manner that the hazard warning triangle, or else the casing, cannot strike the fastening unit and/or the cover element during movements of the motor vehicle. In this way, rattling noises that could be caused by this kind of impact while the motor vehicle is moving are avoided. The fastening unit may also have two or more corresponding clamping elements. The design of the clamping mechanism means that the use of further means to secure the transport position of the hazard warning triangle or else the casing to the fastening unit can be dispensed with, so that the vehicle weight is not increased unnecessarily. The clamping mechanism also allows a user of the motor vehicle to remove the hazard warning triangle from the fastening unit quickly and easily, by hand for example, when it is required.

According to a further advantageous embodiment, the loading space cover comprises at least two clamping units arranged spaced apart from one another which are each configured for the direct or indirect partial, form-fitted receiving of an end portion of the hazard warning triangle and which each have a clamping element. Through the direct partial, form-fitted receiving of the end portions of the hazard warning triangle or the indirect partial receiving of the end portions of the hazard warning triangle via a casing enclosing the hazard warning triangle partially or completely on the clamping units, the hazard warning triangle or the casing is held very securely and true to position on the fastening unit.

The clamping units are advantageously configured and arranged on the cover element in such a manner that the hazard warning triangle can be attached to the clamping units, and removed therefrom, through a movement of the hazard warning triangle parallel to an extension plane of the cover element. In this way, a person standing behind the rear of the motor vehicle with the tailgate open can remove the hazard warning triangle, or the casing partially or completely enclosing the hazard warning triangle, intuitively by exerting a tensile force on the hazard warning triangle or the casing of the fastening unit, and later arrange it back on the fastening unit.

According to a further advantageous embodiment, the fastening unit is produced at least in part from a plastic. This means that the fastening unit is of lightweight design and can easily be connected to the cover element in a substance-bonded manner under the action of heat.

The above problem is furthermore solved by a motor vehicle, wherein the loading space cover according to one of the aforementioned embodiments or any technically feasible combination of at least two of these embodiments is configured with one another, wherein the hazard warning triangle is fastened directly or indirectly via the fastening unit to the cover element.

The advantages referred to above with reference to the loading space cover are correspondingly connected to the motor vehicle. The motor vehicle may, for example, be a passenger vehicle with a fastback or a hatchback. The hazard warning triangle may be arranged on the fastening unit directly or via a casing partially or completely enclosing the hazard warning triangle.

BRIEF DESCRIPTION OF THE DRAWING FIGURES

Further advantageous embodiments of the loading space cover are disclosed in the dependent claims and the following description of the drawings. In the drawings FIG. 1 shows a schematic and perspective representation of an exemplary embodiment of a motor vehicle including the new and improved loading space cover, FIG. 2 shows a schematic and perspective representation of a portion of the loading space cover shown in FIG. 1, FIG. 3 shows a schematic and perspective sectional representation of the loading space cover shown in FIGS. 1 and 2, FIG. 4 shows a schematic and perspective representation of a clamping unit of the loading space cover shown in FIGS. 1 to 3, and FIG. 5 shows a further schematic and perspective representation of the clamping unit shown in FIG. 4.

In the different drawings, identical parts are always provided with the same reference number, which is why these are usually also described only once.

DETAILED DESCRIPTION

FIG. 1 shows a schematic and perspective representation of an exemplary embodiment for a motor vehicle having a loading space cover 2 for a rear loading space 3 of the motor vehicle 1 and a hazard warning triangle arranged in a casing 4 and not therefore shown.

The loading space cover 2 has a cover element 5 for covering an upper side of the rear loading space 3 which defines an upper limit of the loading space 3. The cover element 5 may be of traditional design. The cover element 5 is depicted as semi-transparent in FIG. 1.

Furthermore, the loading space cover 2 has a fastening unit 6 for the indirect fastening of the hazard warning triangle to the cover element 5 via the casing 4 arranged on an underside of the cover element 5 facing the loading space 3. The hazard warning triangle is therefore arranged on the fastening unit 6 indirectly, so via the casing 4, or fastened to the cover element 5 via said casing. The fastening unit 6 is connected to the cover element 5 in a substance-bonded manner, for example. The fastening unit 6 is produced from a plastic.

The fastening unit 6 has two clamping units 7 and 8 arranged spaced apart from one another, each of which is designed for the indirect, partial, form-fitted receiving of an end portion of the hazard warning triangle via the casing 4. The design of the clamping units 7 and 8 is shown more accurately in FIGS. 2 to 5. The clamping units 7 and 8 are, in particular, configured in such a manner and arranged on the cover element 5 in such a manner that the hazard warning triangle, or else the casing 4 receiving said hazard warning triangle, can be mounted parallel to an extension plane of the cover element 5 on the clamping units 7 and 8, and removed therefrom, by way of a movement of the hazard warning triangle or of the casing 4.

Each clamping unit 7 or 8 has a clamping element 9 which is arranged and configured in such a manner that the clamping element 9 is elastically deformed by indirect contact via the casing 4 with the hazard warning triangle at least upon attachment of the hazard warning triangle to the fastening unit 6 and removal of the hazard warning triangle from the fastening unit 6.

FIG. 2 shows a schematic and perspective representation of the loading space cover 2 shown in FIG. 1 obliquely from below. The design of the clamping units 7 and 8 is easier to recognize. Each clamping unit 7 or 8 has a connection surface 10 which is provided with a structure 11. The respective clamping unit 8 or 9 is connected to the covering unit 5 via the respective connection surface 10, e.g. in a substance-bonded manner. In particular, each clamping unit 7 or 8 is welded and/or adhered to the covering unit 5.

The casing 4 is cuboid in design and has two casing parts 12 and 13 of different sizes connected to one another. Each clamping unit 7 and 8 encloses the respective casing part 12 or 13 on three sides and on the end side, so that each clamping unit 7 and 8 forms a receiving means into which the respective casing part 12 or 13 is inserted in a form-fitting manner. The clamping units 7 and 8 are configured in such a manner and arranged on the cover element 5, so that the hazard warning triangle, or else the casing 4 receiving said hazard warning triangle, can be attached to the clamping units 7 and 8, and removed therefrom, by a movement of the hazard warning triangle or the casing 4 in accordance with the double arrow 14 parallel to an extension plane of the cover element 5.

FIG. 3 shows a schematic and perspective sectional representation of the loading space cover 2 shown in FIGS. 1 and 2 in the region of the clamping unit 7. The structuring 11 of the connection surface 10 of the clamping unit 7 is easier to recognize. The structuring 11 means that the connection surface 10 is enlarged, as a result of which the substance-bonded connection between the clamping unit 7 and the cover element 5 is strengthened. In addition, a form fit is produced by the structuring 11 between the clamping unit 7 and the cover element 5, which likewise strengthens the connection between the clamping unit 7 and the cover element 5.

In addition, it can be seen that the clamping unit 7 exhibits a further clamping element 15 which is arranged in respect of the casing 4, or else the casing part 12, opposite the clamping element 9. The clamping element 9 is longer in design than the other clamping element 15. The clamping element 9 encloses the casing 4 on two adjacent sides, as a result of which the position of the casing 4 shown relative to the clamping unit 7 is secured. The other clamping unit 8 of the fastening unit 6 which is not shown in FIG. 3 is configured to correspond to the clamping unit 7, but in a manner mirror-inverted thereto.

Figure 1:
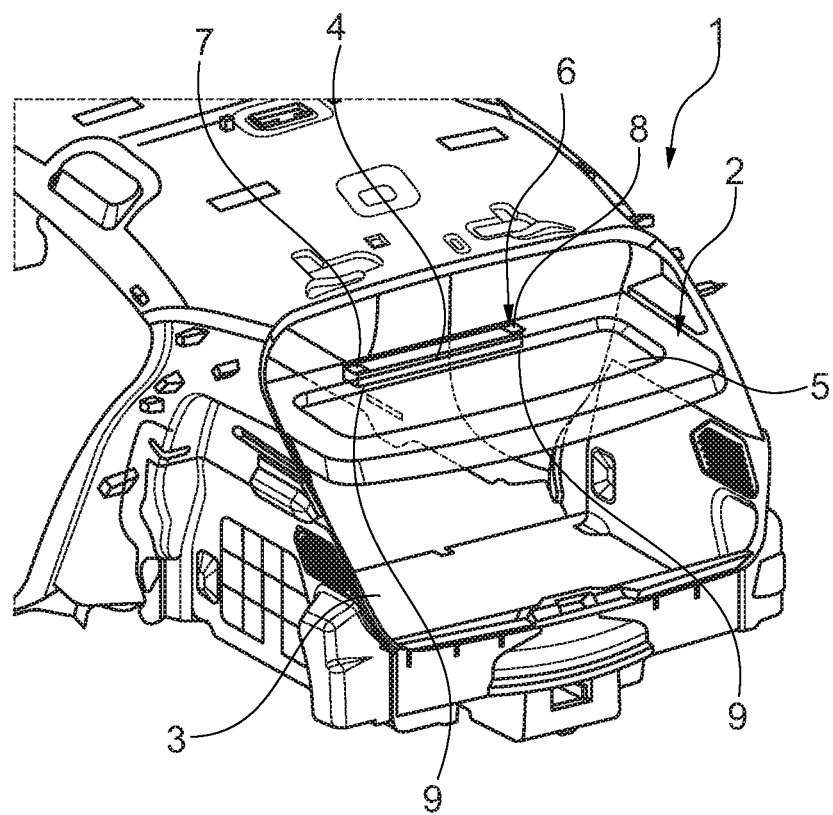
Figure 2:
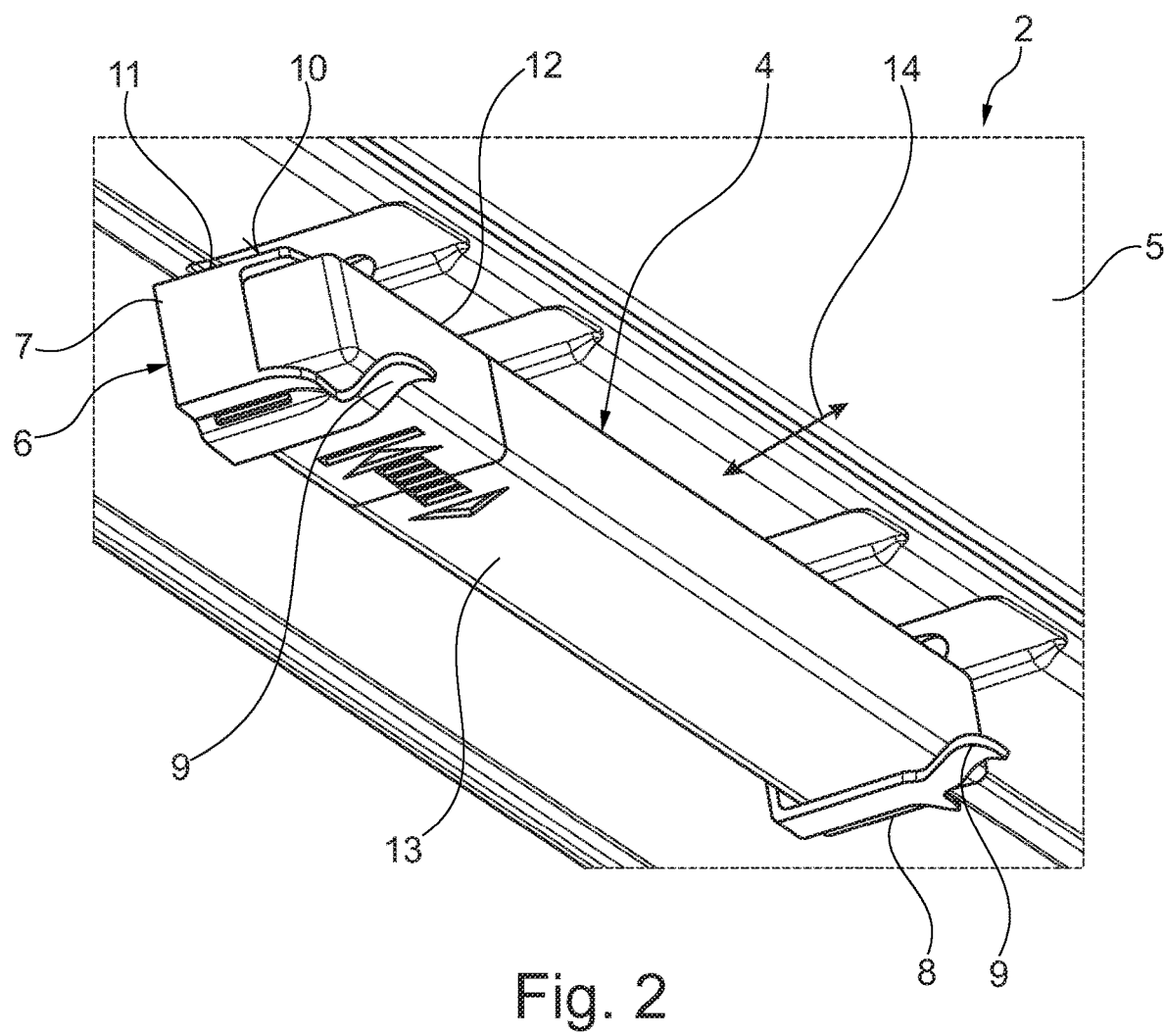
Figure 3:
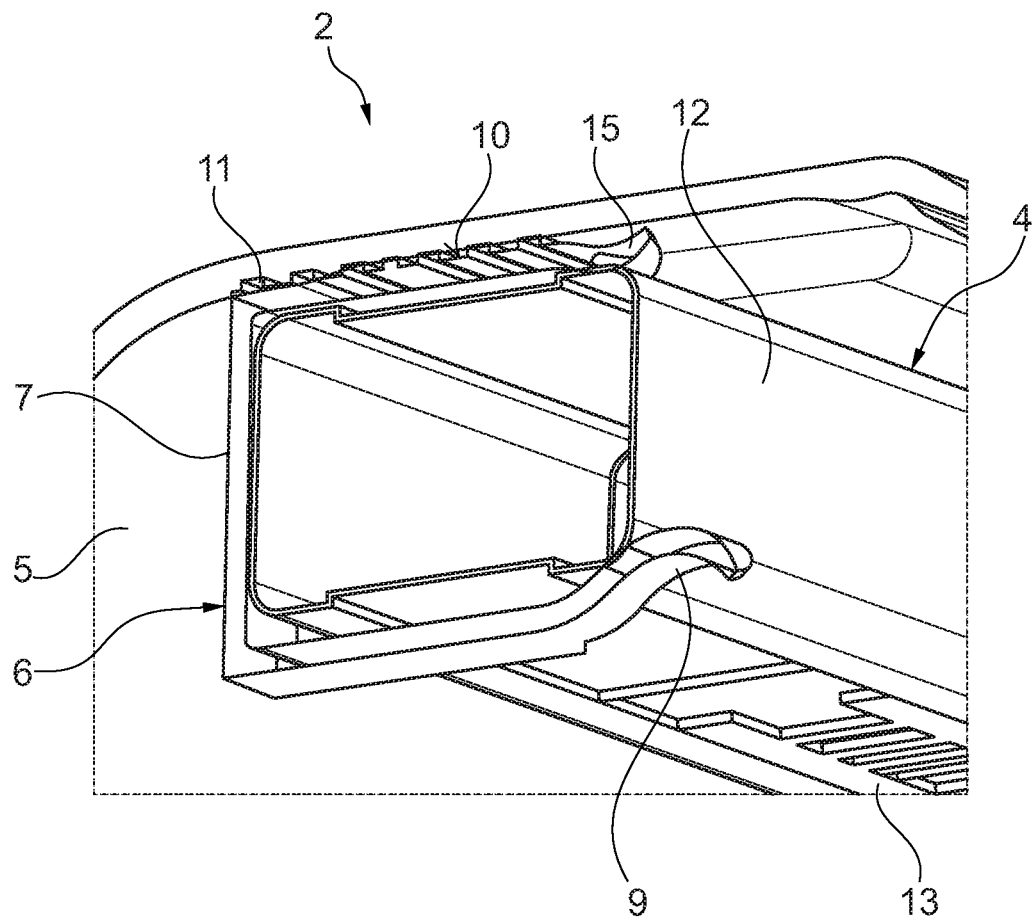
Figure 4:
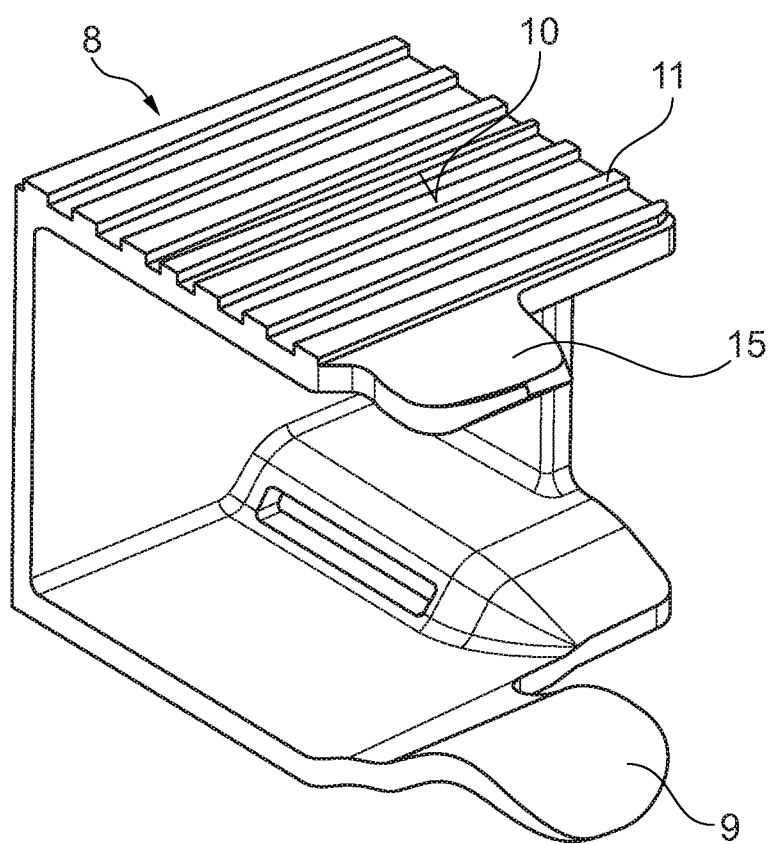
FIG. 4 shows a schematic and perspective representation of a clamping unit 8 of the loading space cover shown in FIGS. 1 to 3. It can be seen that the clamping unit 8 is configured in accordance with the clamping unit shown in FIG. 3, but in a manner mirror-inverted thereto.
Figure 5:
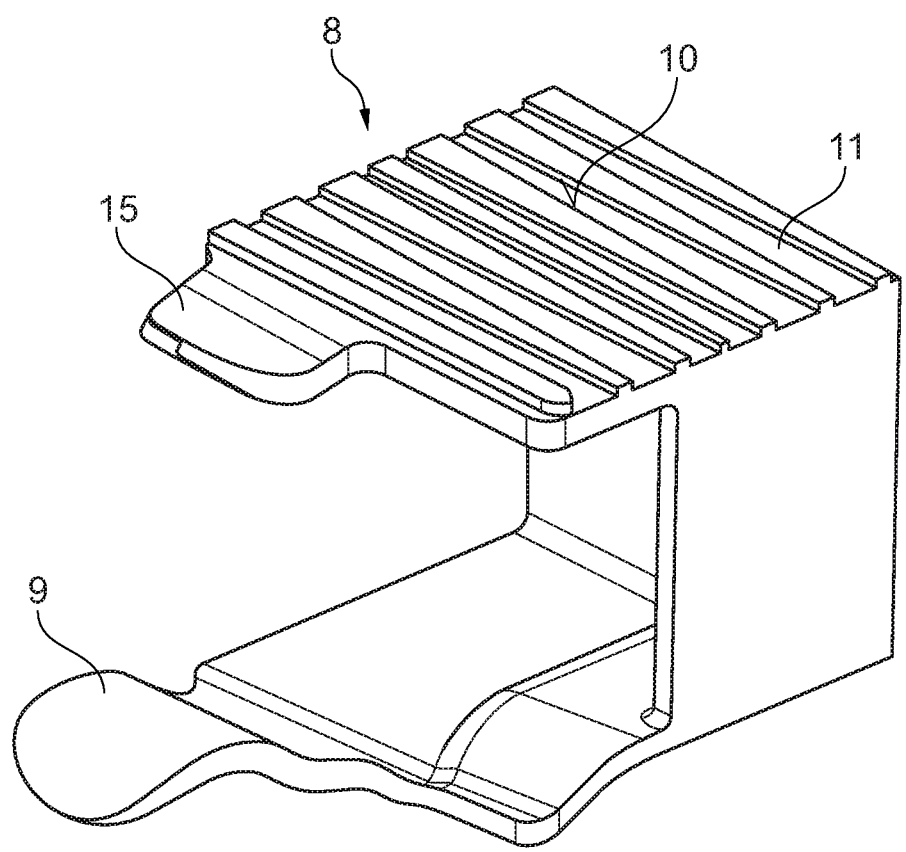
FIG. 5 shows a further schematic and perspective representation of the clamping unit 8 shown in FIG. 4.

What is claimed:

1. A loading space cover for a rear loading space in a motor vehicle:
   comprising at least one cover element for the at least partial covering of an upper side of the rear loading space, wherein the at least one cover element defines an upper limit of the loading space; and
   at least one fastening unit on an underside of the cover element facing the loading space adapted to fasten a hazard warning triangle to the cover element.

2. The loading space cover as claimed in claim 1, wherein the at least one fastening unit is connected in a substance-bonded manner to the at least one cover element.

3. A motor vehicle incorporating the loading space cover of claim 2.

4. The loading space cover as claimed in claim 1, wherein the fastening unit has at least one clamping element wherein the at least one clamping element is elastically deformed by direct or indirect contact with the accessory at least during attachment and removal of the accessory from the fastening unit.

5. The loading space cover as claimed in claim 4, wherein at least two clamping units are spaced apart and configured for direct or indirect partial, form-fitted receiving of an end portion of the accessory.

6. The loading space cover as claimed in claim 5, wherein each of said at least two clamping units includes one of said at least one clamping element.

7. A motor vehicle incorporating the loading space cover of claim 6.

8. The loading space cover as claimed in claim 5, wherein the at least two clamping units are configured on the cover element in such a manner that the accessory can be attached to the at least two clamping units, and removed therefrom, through a movement of the accessory parallel to an extension plane of the at least one cover element.

9. The loading space cover as claimed in claim 8, wherein the at least one fastening unit is produced at least in part from a plastic.

10. A motor vehicle incorporating the loading space cover of claim 9.

11. A motor vehicle incorporating the loading space cover of claim 8.

12. A motor vehicle incorporating the loading space cover of claim 5.

13. A motor vehicle incorporating the loading space cover of claim 4.

14. A motor vehicle incorporating the loading space cover of claim 1.

* * * * *